Oct. 11, 1966 W. B. ZERN 3,278,177
CORNER CLAMPING ASSEMBLY FOR TRIM
Filed Oct. 1, 1965 2 Sheets-Sheet 1
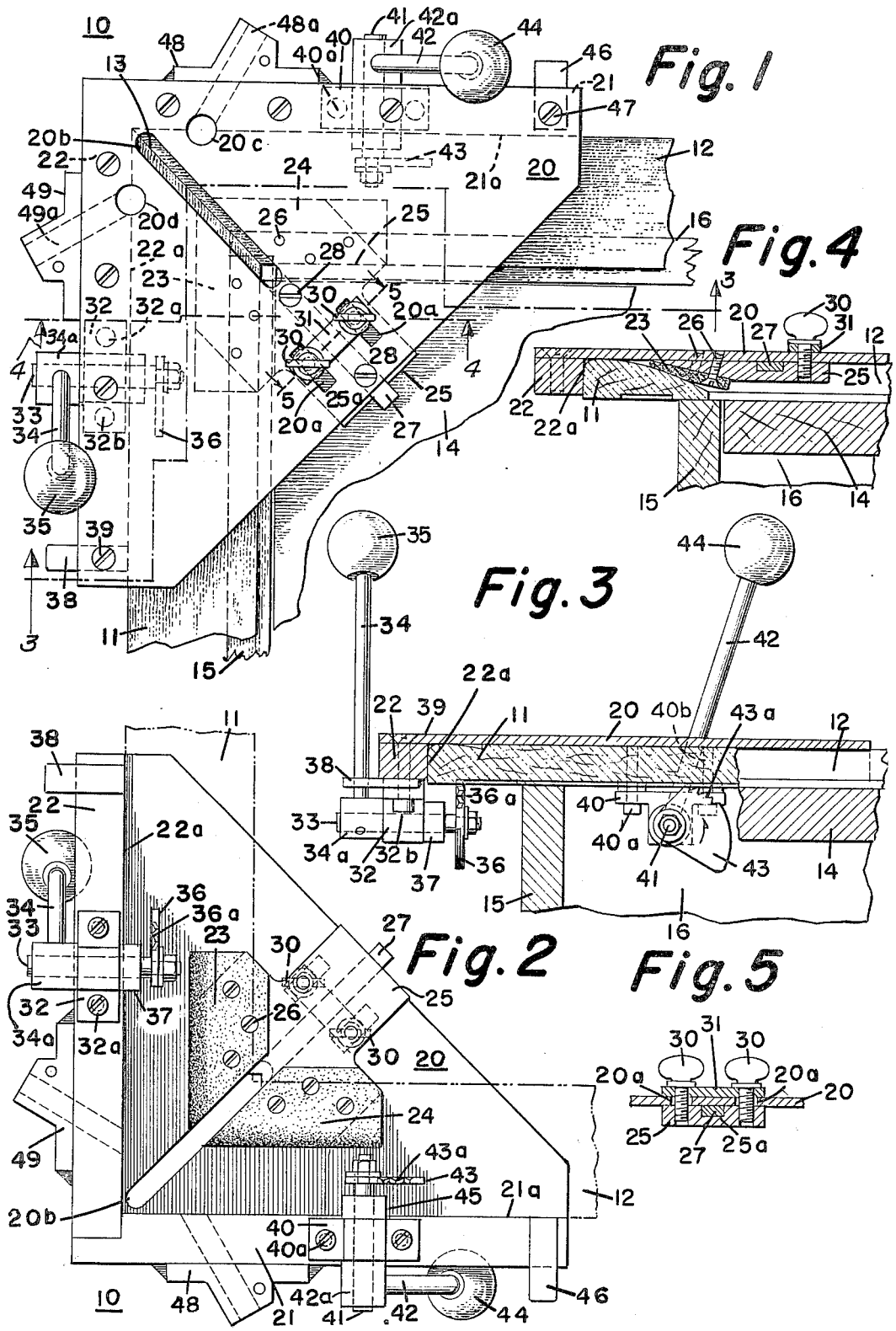

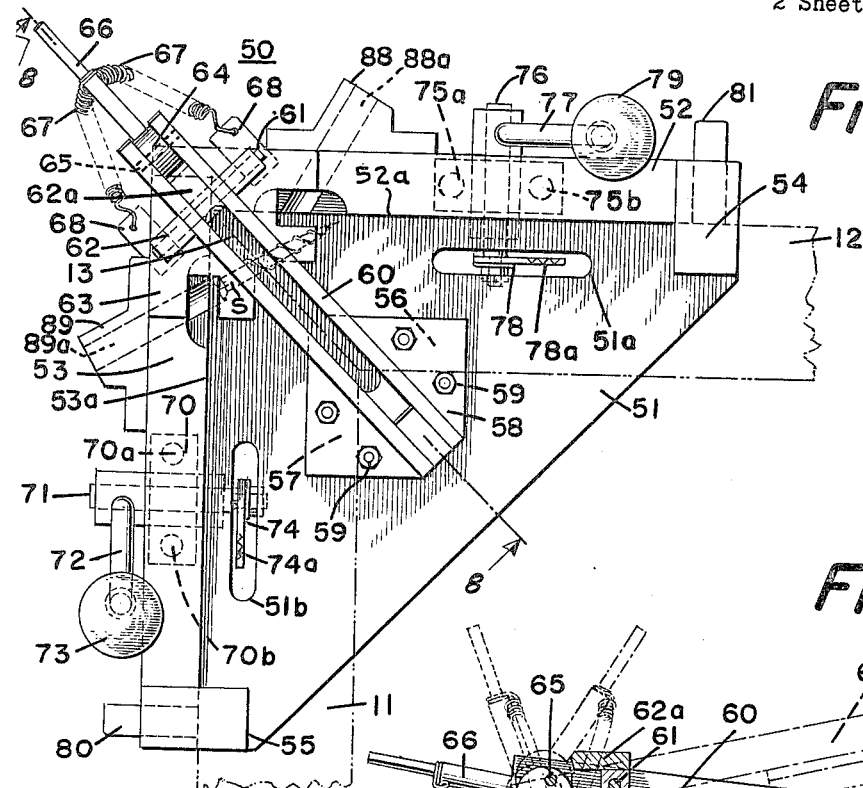
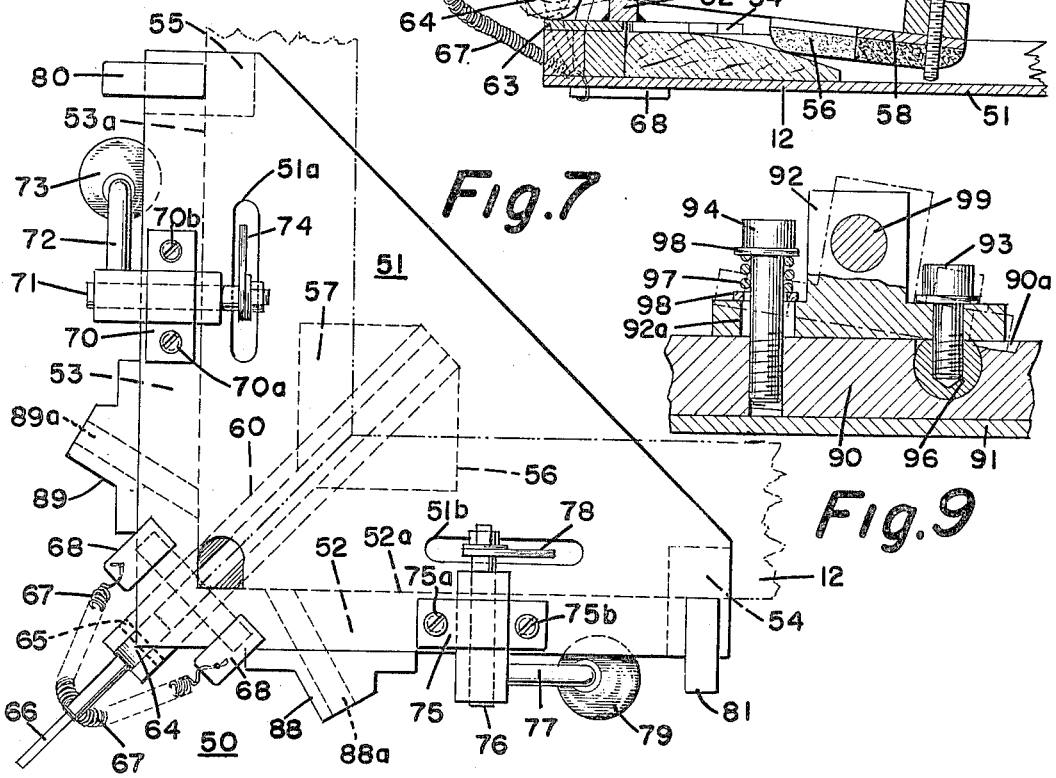
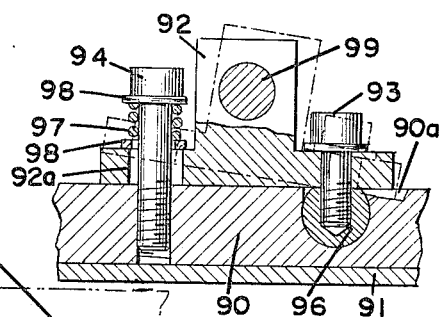

United States Patent Office 3,278,177
Patented Oct. 11, 1966

3,278,177
CORNER CLAMPING ASSEMBLY FOR TRIM
Warren B. Zern, 1016 N. Evans and Mineral Sts.,
Pottstown, Pa.
Filed Oct. 1, 1965, Ser. No. 492,215
10 Claims. (Cl. 269—41)

This is a continuation-in-part of parent application Serial No. 401,170, filed October 2, 1964. This invention relates to a corner clamping assembly and has for an object an improved apparatus for clamping together the adjacent mitered ends of trim members to form a close fitting mitered joint. The present invention provides a corner clamping assembly which is more easily adjusted than the assembly disclosed in said parent application and also provides a corner clamping assembly which is particularly suited for clamping trim members when they are not secured to a door or window frame.

In accordance with the present invention there is provided an apparatus for clamping together the adjacent mitered ends of trim members to form a close fitting mitered joint including a frame or support structure having first means thereon including locating surfaces positioned at a right angle to each other to engage the outer edges of a pair of trim members. There is also second means carried by the support structure on the same side thereof as said first means including second locating structure having an outer surface shaped to engage the face of the trim members in cooperation with the first-named locating surfaces, the second means being adjustable along the bisector of the right angle formed between the locating surfaces on the first means. The support structure also carries clamping means for controlling the position of the second means along the bisector of the right angle and the support structure also carries means for applying a force to the back surfaces of the trim members, the force acting in a direction toward the second locating structure and longitudinally of the first-named locating surfaces to clamp the mitered ends of the trim members in close fitting relation.

In accordance with a further aspect of the invention the locating structure for engaging the face of the trim members is carried by a lever pivoted intermediate its ends and adapted to be locked in position against the face of the trim members by clamping means.

In accordance with a further aspect of the invention the means carried by the support structure for applying a force to the back surfaces of the trim members are provided with resilient mountings.

For a more detailed disclosure of the invention and for further objects and advantages thereof, reference is to be had to the following description taken in conjunction with the accompanying drawings in which:

FIG. 1 is a top plan view of a corner clamping assembly embodying the present invention;

FIG. 2 is a bottom plan view of the corner clamping assembly shown in FIG. 1;

FIG. 3 is a vertical sectional view taken along the lines 3—3 in FIG. 1;

FIG. 4 is a vertical sectional view taken along the lines 4—4 in FIG. 1;

FIG. 5 is a vertical sectional view taken along the lines 5—5 in FIG. 1;

FIG. 6 is a top plan view of a corner clamping assembly illustrating a modification of the invention;

FIG. 7 is a bottom plan view of the corner clamping assembly shown in FIG. 6;

FIG. 8 is a vertical sectional view taken along the lines 8—8 in FIG. 6; and

FIG. 9 is a vertical sectional view of a modified bearing block support for the corner clamping assemblies shown in FIGS. 1–8.

Referring to FIG. 1 there is illustrated a corner clamping assembly 10 which is adapted for clamping together the adjacent mitered ends of trim members 11 and 12 to form a close fitting mitered joint 13. The trim members 11 and 12 have been illustrated as trim members for a door 14, the trim members 11 and 12 being secured respectively to door jamb members 15 and 16. The corner clamping assembly 10 comprises a frame or support including a top plate 20 beneath which is secured a pair of locating blocks 21 and 22 which are arranged with their locating surfaces 21a and 22a at right angles to each other for engagement by the rear edges, respectively, of the trim members 12 and 11. The curved faces of the trim members 11 and 12 are adapted to be engaged by locating surfaces 23 and 24 carried by a slide member 25 which is adjustable along the bisector of the right angle formed between the locating surfaces 21a and 22a. The locating surfaces 23 and 24 preferably are formed from a fiber board material or suitable equivalent and are shaped so as not to scar the face of the trim members 11 and 12, FIG. 4. As may be seen in FIG. 2 the locating surfaces 23 and 24 are adapted to be secured to the slide member 25 as by screws 26.

To guide the slide 25 along the bisector of the right angle formed between locaing surfaces 21a and 22a there is provided a guide member 27 which exends along the bisector and is secured to the plate 20 by screws 28, FIG. 1. The guide member 27 is in the form of a bar which is adapted to be received in a correspondingly shaped groove 25a in slide 25, FIG. 5. The slide 25 is adapted to be clamped to the plate 20 by means of a pair of thumb screws 30 which extend through a strap member 31 on the upper side of the plate 20 and through openings 20a in the plate 20 into the slide member 25 beneath the plate 20, FIG. 5. As may be seen in FIGS. 1 and 2 the openings or slots 20a in plate 20 extend lengthwise of the bisector of the right angle formed between the locating surfaces 21a and 22a. Thus the slide member 25 and its locating surfaces 23 and 24 may be adjusted along the bisector of the right angle so as to engage the face of the trim members 11 and 12 in the desired position. It will be also noted in FIG. 2 that the locating surfaces 23 and 24 are positioned at right angles to each other and are parallel to the respective locating blocks 22 and 21. While the trim members 11 and 12 have been illustrated as having curved faces (particularly note trim member 11 shown in FIG. 4) the locating surfaces 23 and 24 have been shaped so as to permit them to locate trim members of any configuration.

Secured to the under side of locating block 22 by screws 32a, 32b is a bearing block 32 through which extends a shaft 33. One end of the shaft 33 is secured to an end of an operating lever 34 having a knob 35. The opposite end of shaft 33 is secured to a cam 36 which is adapted to be rotated in a vertical plane against the bottom surface of the trim member 11, FIG. 3, by the operating lever 34. As may be seen in FIGS. 2 and 3 a collar 37 is positioned on the shaft 33 between the cam 36 and the bearing block 32 and cooperates with the end 34a of lever 34 in maintaining the shaft 33 centrally of the bearing block 32. A stop member 38 is secured by a screw 39 to the under side of locating block 22, FIGS. 1–3, to limit the rotation of the lever 34 about the axis of shaft 33. The stop 38 serves as a rest for the lever 34 when the operator is handling the clamping assembly 10 in between clamping operations.

A similar bearing block 40 is attached to the lower surface of locating block 21 by screws 40a, 40b. A shaft 41 extends through the bearing block 40 and the opposite ends of the shaft 41 are connected to a lever 42 and a cam 43, FIGS. 1 and 2. The outer end of lever 42 is provided with a knob 44 for ease of operation. A collar 45 on shaft 41 cooperates with the end 42a of lever 42 in maintaining the shaft 41 centrally of the bearing block 40. The locating block 21 has a stop member 46 secured to the bottom surface thereof by a screw 47, FIGS. 1 and 2, and serves as a rest for the lever 42 during the handling of the clamping assembly 10 by the operator.

As viewed in FIG. 3, both of the levers 34 and 42 and their corresponding knobs 35 and 44 are adapted to be rotated in an upward direction toward the plate 20 as indicated by the arrow on cam 43. The levers 34 and 42 have been illustrated in FIG. 3 in the up or clamped position with the cams 36 and 43 respectively engaging the back surfaces of trim members 11 and 12. When the lever 42 has been moved to the clamped position shown in FIG. 3 from its unclamped position where the lever 42 rests on the stop 46, the cam 43 applies a force to the under side of the trim member 12, such force acting not only in an upward direction, FIG. 3, but also in a longitudinal direction toward the corner of the clamping assembly 10. Likewise, when the lever 34 is moved off of its stop or support 38 and to its clamped position shown in FIG. 3, the cam 36 applies a force to the under side of the trim member 11, such force acting in an upward direction and also in a longitudinal direction toward the corner of the clamping assembly 10. The locating surfaces 23 and 24 which engage the faces of the trim members 11 and 12 maintain the latter in alignment and the combined action of the forces described above causes the mitered ends of the trim members 11 and 12 to be forced into tight engagement as indicated by the mitered joint 13 in FIG. 1.

With the cams 36 and 43 both acting in vertical as well as longitudinal directions, it is assured that the trim members 11 and 12 will be pressed tightly together at the mitered joint 13 even though there may be some warpage of the trim members. By locating the trim members 11 and 12 from their front faces, it is assured that the mitered joint 13 will be flush at the faces even though the trim members may be of different thickness. This is not possible when the trim members are located from the backs thereof. As may be seen in FIGS. 1 and 2 the plate 20 is provided with an elongated slot 20b which extends along the bisector of the right angle formed between the locating surfaces 21a and 22a on the locating blocks 21 and 22. The slot 20b enables the operator to see the mitered joint 13 formed between the trim members 11 and 12. By positioning the locating surfaces 23 and 24 on a common slide 25 both surfaces are adjustable concurrently thus enabling the operator to position the locating surfaces 23 and 24 rapidly in the desired position relative to the faces of the trim members 11 and 12. As the mitered joint 13 will always extend along the bisector of the right angle formed between the locating surfaces 21a and 22a it is only necessary to adjust the slide 25 along this bisector to accurately position the locating surfaces 23 and 24 in the desired positions regardless of the size of the trim members 11 and 12.

When the trim members 11 and 12 have been clamped in the position shown in FIGS. 1–4, they are now ready to have the mitered joint secured together. The assembly 10 is of the universal type, i.e. adapted for clamping righthand or lefthand trim corners. Thus the assembly 10 is provided with a pair of tool guides 48 and 49 which are respectively secured to the sides of the locating blocks 21 and 22, FIGS. 1 and 2. The tool guides 48 and 49 are provided with passages 48a and 49a respectively for receiving a suitable tool for drilling a screw opening and also providing a counter sink for the head of the screw. Such tools are well known in the art and have not been illustrated here. The passages 48a and 49a also extend through the corresponding locating blocks 21 and 22 and terminate adjacent openings 20c and 20d in plate 20 which permit the operator to see the screw as it is being inserted into the mitered joint. It is customary to insert the screw through the edge of the head trim member. For purposes of explanation it will be assumed that trim member 11 is the head trim member. Thus, after the counter sink has been made in the edge of the head trim member 11, a screw is inserted through the passage 49a in tool guide 49 and into the head trim 11 and thence into the side trim 12 to secure the mitered ends of the trim members into a perfect mitered joint 13. The clamping assembly 10 is then removed from the mitered joint by rotating the levers 34 and 42 downwardly from their clamped positions in FIG. 3 until they rest on the respective stops 38 and 46, FIGS. 1 and 2. This moves the cams 36 and 43 out of engagement with the rear surfaces of the trim members 11 and 12 and permits the removal of the clamping assembly 10.

While the clamping assembly 10 illustrated in FIGS. 1–5 is particularly suited for clamping together the adjacent mitered ends of trim members supported on the respective jambs of doors or window frames, the clamping assembly 50 illustrated in FIGS. 6–8 is particularly adapted for clamping together the adjacent mitered ends of any trim members including trim or molding for picture frames. As may be seen in FIG. 6 the corner clamping assembly 50 comprises a frame including a bottom plate 51 on top of which is secured a pair of locating blocks 52 and 53 which are arranged with their locating surfaces 52a and 53a at right angles to each other for engagement by the rear edges, respectively, of the trim members 12 and 11. The trim members are adapted to be positioned as shown in FIG. 1 with their mitered ends in engagement. The trim members 11 and 12 are positioned on top of the plate 51 and beneath the guide members 54 and 55 which are secured respectively to the top surfaces of locating blocks 52 and 53.

The top faces of the trim members 11 and 12 adjacent the mitered joint 13 are adapted to be engaged by locating surfaces 56 and 57 which are carried by the lower surface of member 58 and are positioned above the plate 51. The locating surfaces 56 and 57 preferably comprise fiber board members, or equivalent, which are shaped to engage the face of the trim members as shown by surface 56 engaging the face of trim member 12 in FIG. 8. Locating surfaces 56 and 57 are adapted to be secured to the member 58 as by bolts 59, FIG. 6. The member 58 is carried at one end of a lever 60 which is pivoted intermediate its ends on a pivot 61 which is supported in a position perpendicular to the bisector of the right angle formed between locating surfaces 52a and 53a by means of support structure 62 secured to a plate 63 mounted on the top surfaces of locating blocks 52 and 53 at their corner of intersection in the assembly 50.

On the opposite end of the lever 60 from the locating member 58 is an eccentric cam 64 which is adapted to be rotated about a pivot 65 extending through the lever 60, FIG. 8, and spaced from the pivot 61. The eccentric cam 64 has secured thereto an operating lever 66 to which is connected a pair of tension springs 67, the opposite ends of which are connected to anchor plates 68 which are secured to the bottom surface of the plate 51. The full line position of the parts shown in FIG. 8 is the clamping position for the lever 60. It will be noted that the locating surface 56 is in engagement with the face of the trim member 12 and the springs 67 hold the cam operating lever 66 in a position such that the eccentric cam 64 is in engagement with the top mounting plate 63 and the pivot 65 for the eccentric cam 64 is at a position above the pivot 61 for lever 60. With the various parts in this position it will be seen that the locating surface 56 is locked in position against the face of the trim member 12. It will also be apparent that the locating surface 57 will likewise be locked in position against the face of the trim member 11 since both locating surfaces 56 and 57 are carried by the lever 60.

To move the locating surfaces 56 and 57 out of engagement with the faces of the trim members 11 and 12 the operating lever 66 for the eccentric cam 64 is moved in a clockwise direction as viewed in FIG. 8 through its center phantom line position to its righthand phantom line position where the lever 66 engages a stop member 62a carried by the mounting block 62. It will be seen that the cam 64 moves to an over-center position with respect to its pivot 65 and the tension spring 67 will be effective to hold the lever 66 against the stop 62a. In this position the eccentric cam 64 will have been raised above the plate 63 and out of contact with it as shown in FIG. 8. The lever 60 will also have been moved from its full line position in FIG. 8 to its phantom line position. The outer end of the lever 60 is provided with an adjustable screw member 69 which extends through member 68 and is adapted to have its end adjacent the plate 51, FIG. 8. The tension springs 67 have a substantial amount of strength and the adjusting screw 69 can be adjusted to limit the movement of the locating member 58 toward the plate 51.

Referring to the bottom plan view of FIG. 7 it will be seen that secured to the under side of plate 51 and beneath the locating block 53 is a bearing block 70 through which extends a shaft 71. One end of the shaft 71 is secured to an end of an operating lever 72 having a knob 73. The opposite end of shaft 71 is secured to a cam 74 which is adapted to be rotated in a vertical plane through an opening 51a in plate 51 and against the bottom surface of the trim member 11. A similar bearing block 75 is secured to the lower surface of plate 51 beneath the locating block 52. A shaft 76 extends through the bearing block 75 and the opposite ends of the shaft 76 are connected to a lever 77 and a cam 78. The outer end of lever 78 is provided with a knob 79 and both the levers 72 and 77 and the cams 74 and 78 are of similar construction to the levers 34 and 42 and cams 36 and 43 previously described and illustrated in connection with FIGS. 1–3. As may be seen in FIG. 7 the plate 51 is provided with a slot 51b through which cam 78 is adapted to be rotated for engagement with the bottom surface of the trim member 12. When the levers 72 and 77 are not in their clamping position, which is the position shown in FIGS. 6 and 7, the levers 72 and 77 are adapted to respectively rest on the stop members 80 and 81 which correspond to members 38 and 46 in FIGS. 1 and 2.

In operation of the clamping assembly 50 the trim members, such as members 11 and 12, are first inserted in the assembly with their mitered ends adjacent as shown in FIG. 6. The trim members 11 and 12 are positioned on top of plate 51 and beneath the respective guide members 54 and 55. The operating lever or handle 66 for lever 60 which carries the locating structure 58 and associated locating surfaces 56 and 57 is moved to the full line position as shown in FIG. 8. This brings the pivot 65 of the eccentric cam 64 to a position above the pivot 61 for lever 60 and as the eccentric cam 64 rests on the top of plate 63 it will be seen that an upward force applied to the locating surfaces 56 and 57 will not cause the lever 60 to rotate in a counter clockwise direction about its pivot 61. It will thus be seen that the trim locating surfaces 56 and 57 have been locked in fixed position with respect to the assembly 50 and thus correspond to the locating surfaces 23 and 24 in FIGS. 1 and 2 which are secured to the top plate 20 of clamping assembly 10.

After the operating lever 66 has been moved to the full line position shown in FIG. 8 the operating levers 72 and 77 are then adapted to be raised from their positions on their rest or stop members 80 and 81 to their full line positions shown in FIGS. 6 and 7. This upward rotation of the levers 72 and 77 causes their respective shafts 71 and 76 to rotate and in turn move their respective cams 74 and 78 up through the corresponding slots 51a and 51b in bottom plate 51 into engagement with the bottom surfaces of the trim members 11 and 12. The force applied to the under side of the trim members 11 and 12 by the cams 74 and 78 not only acts in upward direction toward the locating surfaces 56 and 57 but also in a longitudinal direction toward the corner of the clamping assembly 50. The combined action of the forces of the cams 74 and 78 causes the mitered ends of the trim members 11–12 to be forced into tight engagement at 13. The locating surfaces 56 and 57 which engaged the faces of the trim members 11 and 12 limit the upper movement of the trim members by the cams 74 and 78. By locating the trim members 11 and 12 from their front faces, it is assured that the mitered joint will be flush at the faces of the trim even though the trim members may be of different thickness and even though there may be some warpage in the trim members. From the foregoing it will be seen that the clamping assembly 50 is adapted to produce perfect mitered joints of trim members the same as the clamping assembly 10 previously described and illustrated in connection with FIGS. 1–5 although the trim members are not supported on a door or window frame.

The assembly 50 is provided with tool guides 88 and 89 having passages 88a and 89a similar to the tool guides 48 and 49 previously described in connection with FIGS. 1 and 2. When the trim members 11 and 12 are clamped in the position shown in FIG. 6 they are now ready to have the mitered joint secured together. After a screw opening has been drilled in one of the trim members by inserting a suitable tool through the desired one of the tool guides 88 or 89, a screw is then adapted to be inserted through the tool guide to secure the mitered ends of the trim members together. Such screws have been illustrated in FIG. 6 holding the mitered ends of the trim members 11 and 12 tightly together along the mitered joint 13.

While the bearing blocks 32 and 40 shown in FIGS. 1–3 and the bearing blocks 70 and 75 shown in FIGS. 1 and 2 may be secured tightly to the frame of their respective clamping assemblies by their respective screws, there is illustrated in FIG. 9 a modified form for mounting such bearing blocks to permit relative movement between the blocks and the frame of the clamping assembly. As may be seen in FIG. 9 a locating block 90, corresponding to one of the locating blocks 21, 22, FIGS. 1 and 2, or locating blocks 52 and 53, FIGS. 6 and 7, is secured to a plate member 91. The bearing block 92 is mounted on the locating block 90 by means of a pair of screws 93 and 94. The member 90 is provided with a transverse opening to receive an anchor pin 96 which is adapted to pivot about its axis. The pin 96 has a tapped hole which extends perpendicular to the axis of the pin 96, the tapped hole being adapted to receive the threaded end of the screw 93. The screw 94 is longer than screw 93 and its lower end may be threaded directly into a tapped hole in the member 90 or the member 90 may be provided with another anchor pin for screw 94 similar to pin 96. The bearing block 92 is provided with an enlarged opening 92a through which the screw 94 extends. A compression spring 97 is positioned on the screw 94 between spaced washers 98. The shaft 99 supported in the bearing block 92 corresponds to the shafts 33 and 41 in FIGS. 1–3 and to shafts 71 and 76 in FIGS. 6 and 7. The shaft 99 is provided with an operating lever (not shown) on one end thereof and a cam (not shown) on the opposite end thereof corresponding to cams 36 and 43 in FIGS. 1–3 or cams 74 and 78 in FIGS. 6 and 7. It will be noted that each of these cams has an outboard or operative end which is adapted to engage the bottom surfaces of the trim members 11 and 12. The outboard ends of these cams are provided with teeth as indicated at 36a and 43a in FIGS. 2 and 3 at 74a and 78a in FIG. 6. The screw 93 in FIG. 9 corresponds to the screws 32a and 40a in FIGS. 1–3 and to screws 70a and 75a in FIGS. 6 and 7. Similarly the screw 94 in FIG. 9 corresponds to screws 32b and 40b in FIGS. 1–3 and to screws 70b and 75b in FIGS. 6 and 7. When the shaft 99 in FIG. 9 is rotated into clamping position the bearing block 92 is adapted to pivot about the pin 96 and move from the full line position in FIG. 9 to the phantom line position. The compression spring 97 on screw 94 provides a resilient mounting for the cams that engage the bottom of the trim members. This enables the corner clamping assemblies to accommodate trim members of different thicknesses and avoids splitting of the trim members by the cams 36, 40, 74 and 78. As may be seen in FIG. 9 the block 90 is notched on its upper surface at 90a to permit the adjacent end of the bearing block 92 to pivot about the axis of the pin 96 when it moves to the phantom line position during a clamping operation.

From the foregoing it will be seen that the corner clamping assemblies 10 and 50 are adapted for easy adjustment in clamping together the adjacent mitered ends of trim members to form a close fitting mitered joint. The term "trim members" as used herein is intended to include all types of frame members adapted to be formed into mitered joints. It is to be understood that the present invention is not limited to the specific arrangements shown and that changes and modifications may be made within the scope of the appended claims.

What is claimed is:

1. Apparatus for clamping together the adjacent mitered ends of trim members to form a close fitting mitered joint comprising:
    support structure,
    first means on said support structure including locating surfaces positioned at a right angle to each other to engage the outer edges of a pair of trim members,
    second means carried by said support structure on the same side thereof as said first means including second locating structure having an outer surface shaped to engage the face of the trim members in cooperation with the first-named locating surfaces, said second means being adjustable along the bisector of said right angle formed between said first-named locating surfaces on said first means,
    clamping means carried by said support for controlling the position of said second means along the bisector, and
    means carried by said support structure for applying a force to the back surfaces of the trim members, said force acting in a direction toward said second means and longitudinally of said first-named locating surfaces to clamp the mitered ends of the trim members in close fitting relation.

2. Apparatus according to claim 1 wherein said second means comprises slide structure cooperating with guide structure carried by said support structure extending along the bisector, said slide structure supporting said second locating structure, the latter including a pair of locating surfaces positioned at a right angle to each other and substantially parallel respectively to said first-named locating surfaces on said first means.

3. Apparatus according to claim 2 wherein said support structure comprises a plate which supports said guide structure, said plate having a pair of openings therethrough, said openings extending along the bisector, and wherein said clamping means comprises adjustable means positioned on one side of said plate and extending through said openings in said plate into said slide structure on the opposite side of said plate for clamping said slide structure to said plate in selected positions along the bisector.

4. Apparatus according to claim 1 wherein said support structure includes a plate adapted to be positioned adjacent the back surfaces of the trim members and said plate has openings therein to receive said means carried by said support structure for applying a force to the back surfaces of the trim members whereby said force acts in a direction away from said support structure.

5. Apparatus according to claim 1 wherein said second means comprises a lever pivoted intermediate its ends on said support structure, one end of said lever carrying said second locating structure, and said clamping means comprises a rotatable cam connected to the opposite end of said lever, the axis of rotation of said cam being positioned off center so as to raise and lower said lever upon rotation of said cam.

6. Apparatus according to claim 1 wherein said second means comprises a lever pivoted intermediate its ends on said support structure, said second locating structure being carried adjacent one end of said lever, said clamping means being connected adjacent the opposite end of said lever, and adjustable means for limiting the movement of said second locating structure relative to said support structure.

7. Apparatus according to claim 1 including resilient supporting means for said means for applying a force to the back surfaces of the trim members.

8. Apparatus for clamping together the adjacent mitered ends of trim members to form a close fitting mitered joint comprising:
    a plate,
    a pair of locating blocks carried by said plate and having locating surfaces positioned at right angles to each other to engage the outer edges of a pair of trim members,
    slide structure carried by said plate and associated with guide structure for adjustment of said slide structure along the bisector of the right angle formed between said first-named locating surfaces,
    a pair of locating surfaces carried by said slide structure and adapted to engage the face of the respective trim members,
    means for clamping said slide structure to said plate,
    a pair of levers respectively carried by said locating blocks, and
    a pair of cams respectively carried by said levers, said cams being adapted to engage the rear surfaces of the respective trim members and shaped to apply a force thereto in the direction of said plate and longitudinally of said blocks to clamp the mitered ends of the trim members in close fitting relation.

9. Apparatus according to claim 6 including resilient mounting blocks for supporting said pair of levers.

10. Apparatus for clamping together the adjacent mitered ends of trim members to form a close fitting mitered joint comprising:
    support structure,
    first means on said support structure including locating surfaces positioned at a right angle to each other to engage the outer edges of a pair of trim members,
    second means carried by said support structure on the same side thereof as said first means including second locating structure having a pair of locating surfaces shaped to engage the respective faces of the pair of trim members in cooperation with the first-named locating surfaces, said second means being adjustable along the bisector of said right angle formed between said first-named locating surfaces on said first means for concurrent adjustment of said second-named locating surfaces, and means carried by said support structure for applying a force to the back surfaces of the trim members, said force acting in a direction toward said second means and longitudinally of said first-named locating surfaces to clamp the mitered ends of the trim members in close fitting relation.

References Cited by the Applicant

UNITED STATES PATENTS

| | | |
|---|---|---|
| 150,223 | 4/1874 | Bernstein et al. |
| 188,657 | 3/1877 | Mosher et al. |
| 748,175 | 12/1903 | Dunne. |
| 786,539 | 4/1905 | Wales. |
| 1,704,747 | 3/1929 | Kopecky. |
| 2,220,794 | 11/1940 | Pearce. |
| 2,814,319 | 11/1957 | Hetman et al. |
| 2,894,543 | 7/1959 | Ivy. |
| 2,917,089 | 12/1959 | Ennis. |

WILLIAM W. DYER, Jr., *Primary Examiner.*

R. J. ZLOTNIK, *Assistant Examiner.*